(12) United States Patent
Kaltenbach et al.

(10) Patent No.: US 8,251,865 B2
(45) Date of Patent: Aug. 28, 2012

(54) METHOD FOR CARRYING OUT A LOAD SHIFT IN A PARALLEL HYBRID VEHICLE DURING HYBRID OPERATION

(75) Inventors: Johannes Kaltenbach, Friedrichshafen (DE); Stefan Wallner, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 333 days.

(21) Appl. No.: 12/671,129

(22) PCT Filed: Aug. 8, 2008

(86) PCT No.: PCT/EP2008/060442
§ 371 (c)(1),
(2), (4) Date: Jan. 28, 2010

(87) PCT Pub. No.: WO2009/021915
PCT Pub. Date: Feb. 19, 2009

(65) Prior Publication Data
US 2010/0210410 A1 Aug. 19, 2010

(30) Foreign Application Priority Data

Aug. 16, 2007 (DE) .......................... 10 2007 038 774

(51) Int. Cl.
*B60W 10/08* (2006.01)
(52) U.S. Cl. ........................................................ 477/5
(58) Field of Classification Search ........................ None
See application file for complete search history.

(56) References Cited

U.S. PATENT DOCUMENTS

| | | | |
|---|---|---|---|
| 4,021,712 A | 5/1977 | Ishihara et al. | |
| 5,560,249 A * | 10/1996 | Nellums | ..................... 74/339 |
| 5,890,392 A | 4/1999 | Ludanek et al. | |
| 6,059,059 A | 5/2000 | Schmidt-Brucken | |
| 6,077,189 A | 6/2000 | Kojima et al. | |
| 6,166,512 A | 12/2000 | Kojima | |
| 6,176,807 B1 | 1/2001 | Oba et al. | |
| 6,299,563 B1 * | 10/2001 | Shimasaki | ..................... 477/5 |
| 6,319,168 B1 | 11/2001 | Morris et al. | |
| 6,504,259 B1 | 1/2003 | Kuroda et al. | |
| 6,505,109 B1 | 1/2003 | Strandell et al. | |
| 6,506,139 B2 | 1/2003 | Hirt et al. | |
| 6,524,219 B2 | 2/2003 | Mesiti et al. | |
| 6,543,561 B1 | 4/2003 | Pels et al. | |
| 6,574,535 B1 | 6/2003 | Morris et al. | |
| 6,634,986 B2 * | 10/2003 | Kima | ..................... 477/107 |
| 6,871,734 B2 | 3/2005 | Kupper et al. | |
| 6,887,184 B2 | 5/2005 | Buchannan et al. | |
| 6,938,713 B1 | 9/2005 | Tahara et al. | |
| 6,941,830 B2 * | 9/2005 | Ibamoto et al. | ............... 74/339 |
| 7,094,176 B2 * | 8/2006 | Budal et al. | ..................... 477/5 |
| 7,331,899 B2 * | 2/2008 | Ortmann et al. | ............... 477/6 |
| 7,395,837 B2 | 7/2008 | Foster et al. | |

(Continued)

FOREIGN PATENT DOCUMENTS

DE 44 38 914 A1 5/1996

(Continued)

*Primary Examiner* — Dirk Wright
(74) *Attorney, Agent, or Firm* — Davis & Bujold, P.L.L.C.

(57) ABSTRACT

A method of carrying out a shift under load during hybrid operation in a parallel hybrid vehicle in which the speed adaptation of the electric machine and the internal combustion engine, required for synchronization to the new gear, is carried out by adapting the speed of the electric machine in a speed regulation mode.

9 Claims, 2 Drawing Sheets

U.S. PATENT DOCUMENTS

| | | |
|---|---|---|
| 7,464,616 B2 | 12/2008 | Leibbrandt et al. |
| 7,500,932 B2 | 3/2009 | Katakura et al. |
| 7,517,298 B2 * | 4/2009 | Ortmann .................... 477/3 |
| 7,530,920 B2 * | 5/2009 | Matsubara et al. ............. 477/3 |
| 7,670,253 B2 * | 3/2010 | Sah ............................ 477/3 |
| 7,708,095 B2 * | 5/2010 | Hirata .................. 180/65.275 |
| 7,794,356 B2 * | 9/2010 | Muta et al. ................... 477/3 |
| 8,109,855 B2 * | 2/2012 | Le Neindre et al. ............. 477/5 |
| 8,123,657 B2 * | 2/2012 | Mittelberger et al. ........... 477/5 |
| 2003/0010548 A1 | 1/2003 | Mesiti et al. |
| 2005/0088123 A1 | 4/2005 | Wakitani et al. |
| 2005/0164827 A1 | 7/2005 | Beaty et al. |
| 2005/0209047 A1 | 9/2005 | Berger et al. |
| 2005/0221947 A1 | 10/2005 | Mesiti et al. |
| 2006/0113858 A1 | 6/2006 | Hino et al. |
| 2006/0199696 A1 | 9/2006 | Gouda et al. |
| 2007/0056783 A1 | 3/2007 | Joe et al. |
| 2007/0095584 A1 | 5/2007 | Roske et al. |
| 2007/0102211 A1 | 5/2007 | Nozaki et al. |
| 2007/0114081 A1 | 5/2007 | Iwanaka et al. |
| 2008/0036322 A1 | 2/2008 | Franke |
| 2008/0245332 A1 | 10/2008 | Rimaux et al. |
| 2009/0048747 A1 * | 2/2009 | Stridsberg .................... 701/55 |
| 2009/0051309 A1 | 2/2009 | Rehm et al. |
| 2009/0146615 A1 | 6/2009 | Zillmer et al. |
| 2009/0223727 A1 | 9/2009 | Tolksdorf |
| 2010/0197452 A1 * | 8/2010 | Kaltenbach et al. ........... 477/14 |
| 2010/0204005 A1 * | 8/2010 | Kaltenbach .................. 477/5 |
| 2011/0172055 A1 * | 7/2011 | Kaltenbach et al. ............. 477/5 |

FOREIGN PATENT DOCUMENTS

| | | |
|---|---|---|
| DE | 196 31 983 C1 | 2/1998 |
| DE | 197 09 457 A1 | 9/1998 |
| DE | 198 14 402 A1 | 10/1999 |
| DE | 199 45 473 A1 | 4/2000 |
| DE | 199 39 334 A1 | 3/2001 |
| DE | 101 26 348 A1 | 1/2002 |
| DE | 103 40 529 A1 | 3/2004 |
| DE | 103 27 306 A1 | 1/2005 |
| DE | 10 2004 022 767 A1 | 7/2005 |
| DE | 600 22 593 T2 | 2/2006 |
| DE | 698 31 468 T2 | 6/2006 |
| DE | 10 2005 015 657 A1 | 10/2006 |
| DE | 10 2006 019 679 A1 | 11/2006 |
| DE | 10 2005 057 607 B3 | 4/2007 |
| DE | 10 2005 051 382 A1 | 5/2007 |
| DE | 11 2006 001 985 T5 | 5/2008 |
| EP | 1 167 834 A1 | 1/2002 |
| EP | 1 177 930 A2 | 2/2002 |
| EP | 1 219 493 A1 | 7/2002 |
| EP | 13 19 546 A1 | 6/2003 |
| EP | 1 450 074 A2 | 8/2004 |
| EP | 1 468 865 A2 | 10/2004 |
| EP | 1 527 927 A1 | 5/2005 |
| EP | 1 255 656 B1 | 3/2006 |
| EP | 1 714 817 A1 | 10/2006 |
| EP | 1 744 083 A2 | 1/2007 |
| EP | 1 762 417 A1 | 3/2007 |
| EP | 1 785 305 A2 | 5/2007 |
| FR | 2 722 738 A1 | 1/1996 |
| FR | 2 796 437 A1 | 1/2001 |
| FR | 2 892 471 A1 | 4/2007 |
| WO | 00/03163 A1 | 1/2000 |
| WO | 02/086343 A1 | 10/2002 |
| WO | 03/066367 A1 | 8/2003 |
| WO | 2004/111441 A1 | 12/2004 |
| WO | 2006/020476 A2 | 2/2006 |
| WO | 2006/053624 A1 | 5/2006 |

\* cited by examiner

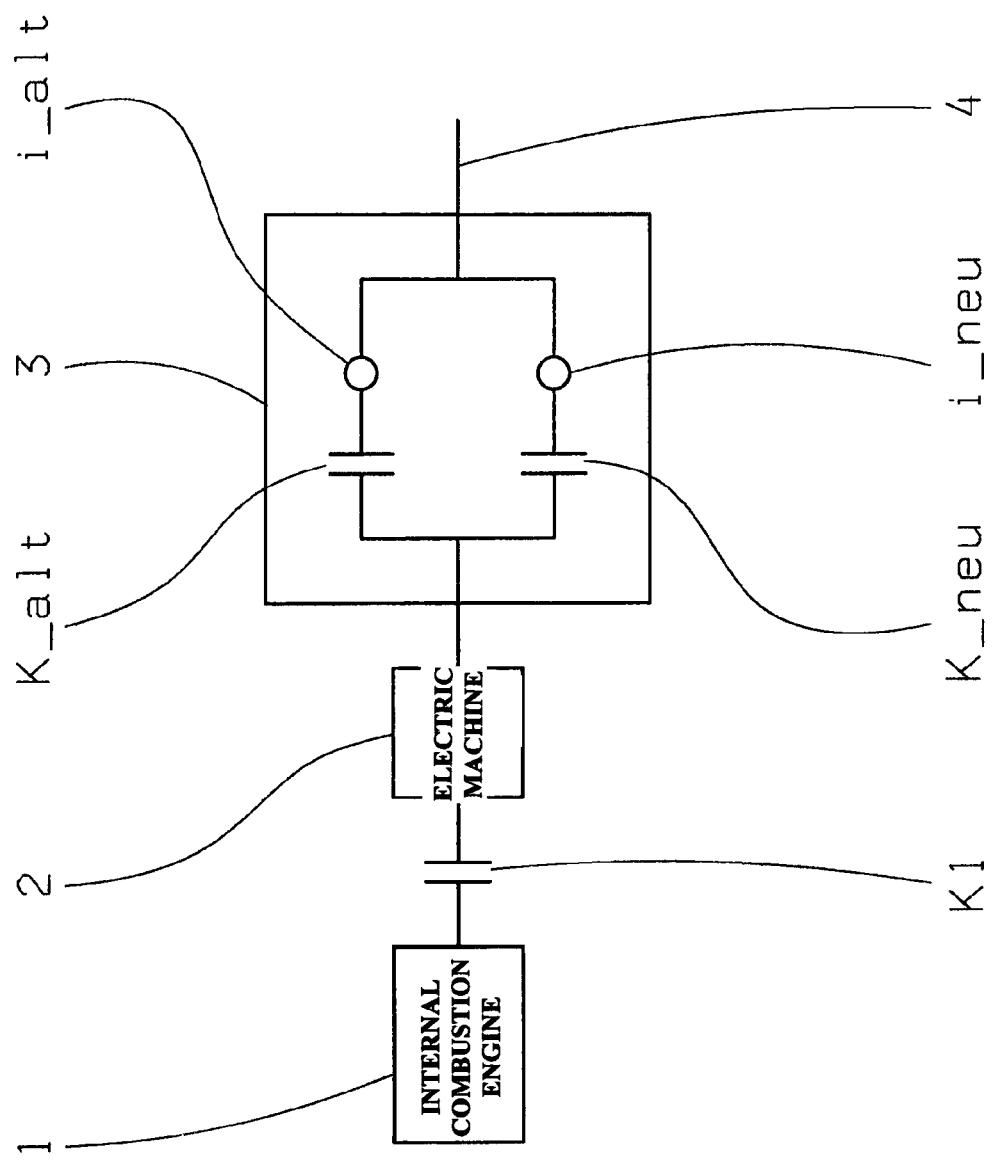

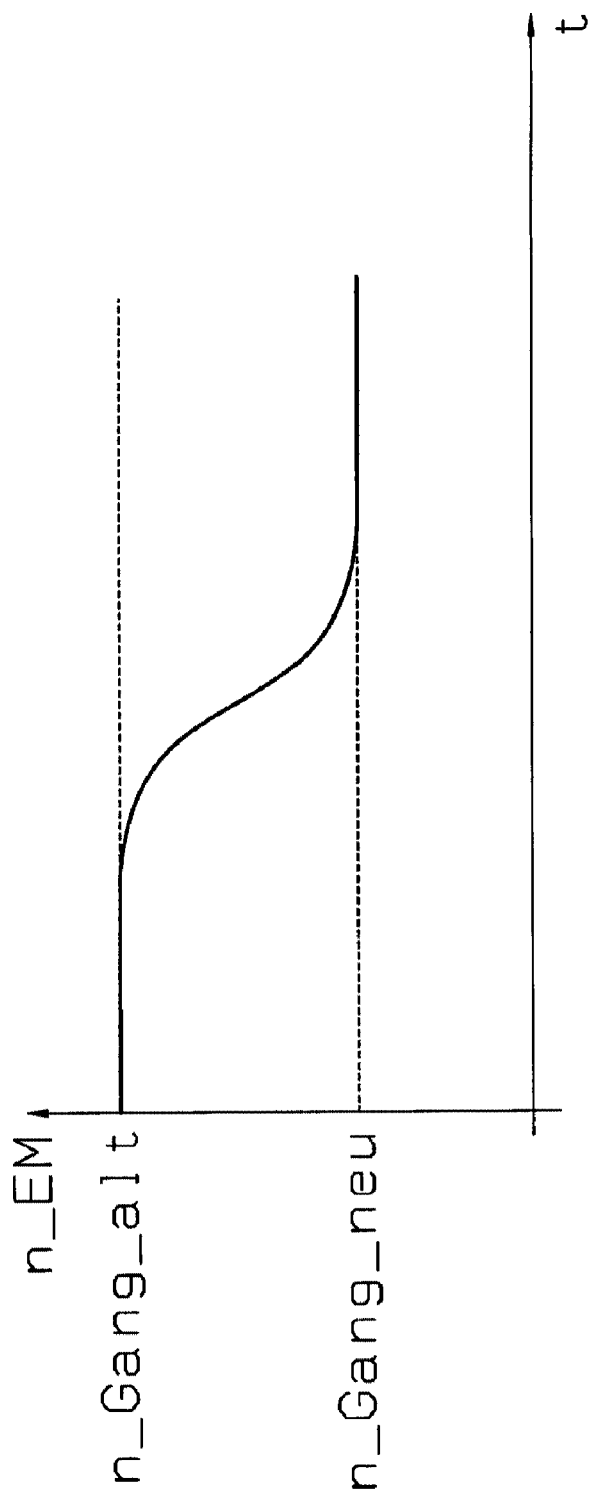

METHOD FOR CARRYING OUT A LOAD SHIFT IN A PARALLEL HYBRID VEHICLE DURING HYBRID OPERATION

This application is a National Stage completion of PCT/EP2008/060442 filed Aug. 8, 2008, which claims priority from German patent application serial no. 10 2007 038 774.3 filed Aug. 16, 2007.

FIELD OF THE INVENTION

The present invention relates to a method for carrying out a load shift during hybrid operation in parallel hybrid vehicles.

BACKGROUND OF THE INVENTION

From the prior art, hybrid vehicles comprising a hybrid drive are known. Besides the internal combustion engine they comprise at least one electric motor or electric machine. In serial hybrid vehicles a generator supplies electrical energy to the electric motor that drives the wheels. In addition parallel hybrid vehicles are known, in which the torques of the internal combustion engine and of at least one electric machine that can be connected to the internal combustion engine are added. In this case the electric machines can be connected to the belt drive or to the crankshaft of the internal combustion engine. The torques produced by the internal combustion engine and/or the at least one electric machine are transmitted to the driven axle by a downstream transmission.

For example, from DE 102006019679 A1 a drivetrain with an electrically controllable hybrid drive and an electro-hydraulic control system, a number of electric power units and a number of torque transmission mechanisms is known. In this case the torque transmission mechanisms can be selectively engaged by the electro-hydraulic control system to produce four forward gears, a neutral condition, an electric operating mode with low and high rotation speeds, an electrically adjustable operating mode with low and high rotation speeds, and an uphill operating mode.

From DE 102005057607 B3 a hybrid drive for vehicles is known, which comprises at least a main motor, in particular an internal combustion engine, a generator, an electric motor and a planetary transmission comprising a sun gear, a ring gear, a planetary gear carrier and planetary gearwheels, which has at least one drive output shaft. In this case it is provided that for a first driving range of the vehicle, in order to add the torques, the driveshafts of the main motor and of the electric motor are coupled to the sun gear of the planetary transmission, and for a further driving range one of the two motors can be coupled by frictional means to the ring gear of the planetary transmission for the mechanical addition of the rotation speeds in accordance with the superimposition principle.

In a shift under load carried out according to the prior art the speed adaptation of the motor required for synchronization to the new gear takes place with the help of the shift elements involved and by action upon the motor torque.

For example, in a traction upshift the transmission capacity of the shift element to be engaged is first increased in order to take up the load and at the same time the transmission capacity of the shift element to be disengaged is reduced, and when the load has been taken up by the shift element being engaged, the speed of the motor is adapted with the help of the shift elements and by action upon the torque. In a load shift during hybrid operation of a hybrid vehicle the motor is formed by the internal combustion engine and the electric machine. Then, the shift element being disengaged is disengaged completely and the shift element being engaged is engaged completely.

According to the prior art, during load shifts of this type the internal combustion engine and the electric machine remain torque-controlled during the shift with specification of a nominal driving torque, and action takes place on the part of the shift sequence control system, this torque action being shared between the internal combustion engine and the electric machine.

SUMMARY OF THE INVENTION

The purpose of the present invention is to indicate a method for carrying out a shift under load during hybrid operation in parallel hybrid vehicles, in which the shifting times are made shorter and the shifting comfort is increased.

According to the claims, it is proposed to carry out the speed adaptation of the electric machine and the internal combustion engine required for synchronization to the new gear by adapting the speed of the electric machine in a speed regulation mode, such that the electric machine is adjusted under speed regulation to the target or connection speed (synchronous speed) of the new gear so that the shift element to be engaged is synchronized. Since the electric machine is coupled to the internal combustion engine, by virtue of the speed adaptation of the electric machine in a speed regulation mode according to the invention the speed of the internal combustion engine is also adapted.

According to the invention, action is only taken upon the torque of the internal combustion engine if the electric machine cannot produce sufficient torque to comply with the desired speed change or the desired speed variation.

According to the invention, the speed variation is so designed that the speed of the electric machine approaches the target speed with a low gradient. In an advantageous manner, the torques of the shift elements and the internal combustion engine that act upon the electric machine serve as pilot control means for the speed regulation of the electric machine.

During the speed regulation phase the torques at the shift elements determine the drive output torque since the shift elements are operating in slipping mode and are governed by the nominal driving torque.

When the speed of the electric machine reaches the target or synchronous speed of the gear being engaged, the electric machine is changed back again to the torque-controlled mode and the shift element being engaged is engaged completely. On completion of the load shift, the internal combustion engine and the electric machine are coupled to the transmission output by the new transmission gear.

Thanks to the concept according to the invention shifting times are made shorter since the speed of an electric machine can be regulated precisely and dynamically. Furthermore, the smooth approach of the electric machine's speed to the target or synchronous speed of the new gear ensures particularly great shifting comfort since the change of the dynamic torque of the internal combustion engine and the electric machine caused by the mass moment of inertia of the motors at the time when the shift element being engaged 'catches', is only small. A further advantage of the method according to the invention is that the sequence of the load shift is simpler to implement and adjust compared with a shift under load with action upon the torque as in the prior art.

BRIEF DESCRIPTION OF THE DRAWINGS

Below, an example of the invention is explained in more detail with reference to the attached figures, which show:

FIG. 1: Example of a schematic and simplified representation of the drivetrain of a parallel hybrid vehicle; and FIG. 2: Diagram illustrating the variation of the speed of the electric motor during a traction upshift according to the invention

DETAILED DESCRIPTION OF THE PREFERRED EMBODIMENTS

Referring to FIG. 1, the drivetrain of a parallel hybrid vehicle comprises an internal combustion engine 1 and at least one electric machine 2 connected in that order one after the other, so that by disengaging a clutch K1 the internal combustion engine 1 can be decoupled from the electric machine 2 and thus from the drivetrain as a whole. To carry out the method proposed here the clutch K1 is engaged, so that the two motors are coupled to one another and the torques of the motors 1 and 2 are added.

After the electric machine 2 in the force flow direction is arranged a change-under-load transmission 3 which, in the simplified example representation shown for the purpose of illustrating the method according to the invention, comprises a clutch K_neu to be engaged for the new gear being engaged and a clutch K_alt to be disengaged for the old gear, each clutch or each gear being associated with a transmission ratio step with transmission ratios i_neu and i_alt respectively. In FIG. 1 the drive output of the change-under-load transmission is indexed 4.

In what follows, the method according to the invention is described with reference to a traction upshift from i_alt to i_neu.

According to the invention, the shift begins like a conventional shift; the transmission capacity of the clutch K_neu to be engaged in order to take up the load is first increased and at the same time the transmission capacity of the clutch K_alt to be disengaged is reduced. Once the load has been taken up by the clutch K_neu the electric machine 2 is changed from the torque-controlled mode to a speed regulation mode and in this speed regulation mode the speed of the electric machine 2 (and therefore also that of the internal combustion engine 1 coupled to the electric machine 2) is adapted in such manner that under speed regulation the electric machine 2 is adjusted to the target speed or synchronous speed of the new gear; at the same time the shift element K_alt being disengaged is disengaged completely.

Advantageously, during the speed adaptation of the electric machine 2 its speed variation is designed such that the speed approaches the target or connection speed of the new gear with a low gradient, with the torques of the clutches K_alt, K_neu and of the internal combustion engine 1, which act upon the electric machine 2, serving as pilot control means for the speed regulation. An example variation of the nominal speed of the electric machine 2 n_EM as a function of time is the object of FIG. 2. In the figure n_Gang_alt denotes the speed of the electric machine 2 when the old gear is engaged (i.e. with the clutch K_alt engaged) and n_Gang_neu is the synchronous speed of the new gear during the load shift to be carried out.

When the speed then reaches the synchronous speed n_Gang_neu the electric machine 2 is returned to the torque-controlled mode and the clutch K_neu is engaged completely, so that the internal combustion engine 1 and the electric machine 2 are coupled to the drive output of the transmission by the new transmission gear.

For a traction downshift the transmission capacity of the clutch K_alt to be disengaged is first reduced, and as soon as slip is detected at K_alt the electric machine 2 is changed from the torque-controlled to the speed regulation mode. Then the speed of the electric machine 2 is increased up to a speed higher than the synchronous speed at the clutch K_neu to be engaged, since a positive speed difference must be present at K_neu for that clutch to be able to transmit a traction torque.

In the next step the transmission capacity of the clutch K_neu to be engaged is increased and that of the clutch K_alt being disengaged is reduced further, so that a continuous load transfer to K_neu is achieved. Once the clutch K_neu being engaged has taken up the load, the clutch K_alt being disengaged is disengaged completely and the speed of the electric machine 2 is adjusted to the synchronous speed at the clutch K_neu being engaged. When the synchronous speed has been reached, the electric machine is returned to the torque-controlled mode and the clutch K_neu being engaged is engaged completely.

For the case of a thrust downshift, to take up the load the transmission capacity of the clutch K_neu to be engaged is first increased and at the same time the transmission capacity of the clutch K_alt to be disengaged is reduced. When K_neu has taken up the load the electric machine 2 is changed from the torque-controlled to the speed regulation mode and the clutch K-alt being disengaged is disengaged completely. Then, under speed regulation the electric machine is adjusted to the synchronous speed, preferably in such manner that its speed approaches the target speed with a low gradient. When the synchronous speed has been reached, the electric machine is returned to the torque-controlled mode and the clutch K_neu being engaged is engaged completely.

In the principle of their sequences a thrust upshift and a traction downshift are similar, the difference being that the signs of the torques are different and the speed variation moves in the other direction. Accordingly, in a thrust upshift the transmission capacity of the clutch to be disengaged is first reduced continuously and as soon as slip is detected at K_alt the electric machine is changed from the torque-controlled to a speed regulation mode in which its speed is reduced to a value lower than the synchronous speed at the shift element K_neu to be engaged, since a negative speed difference is required for the shift element being engaged to be able to transmit torque. The transmission capacity of the shift element K_neu being engaged is then increased and that of the shift element being disengaged is reduced still further, so that a continuous load transfer to K_neu takes place.

Once the load has been taken up by the clutch K_neu being engaged, the clutch K_alt being disengaged is disengaged completely and the speed of the electric machine is adjusted in the speed regulation mode to the synchronous speed at the clutch K_neu being engaged. When the synchronous speed has been reached, the electric machine is returned to the torque-controlled mode and the clutch K_neu is engaged completely.

Since in the method according to the invention as a rule no dynamic action on the internal combustion engine takes place, in an advantageous manner exhaust gas emissions are reduced. Furthermore, in upshifts the kinetic energy of the rotating masses of the internal combustion engine and the electric machine released by the speed reduction can be recovered by operating the electric machine as a generator.

Indexes
1 Internal combustion engine
2 Electric machine
3 Change-under-load transmission
4 Drive output of the transmission
K1 Clutch
K_neu Clutch K_alt Clutch
n_EM Speed of the electric machine
n_Gang_alt Speed of the electric machine when the old gear is engaged
n_Gang_neu Synchronous speed of the new gear
i_alt Transmission ratio
i_neu Transmission ratio

The invention claimed is:

1. A method of carrying out a shift under load during hybrid operation in a parallel hybrid vehicle, the method comprising the steps of:
   adjusting a transmission capacity of a new clutch (K_neu) to be engaged to take up the load and, at the same time, adjusting a transmission capacity of an old clutch (K_alt) to be disengaged;
   carrying out speed adaptation of an electric machine (2) and an internal combustion engine (1), required for synchronization to a new gear, by adapting a speed of the electric machine (2) in a speed regulation mode: and
   only acting upon the internal combustion engine (1) if the electric machine (2) cannot supply sufficient torque to comply with the desired speed adaptation or nominal speed variation.

2. The method of carrying out a load shift according to claim 1, further comprising the step of designing the speed variation such that the speed (n_EM) of the electric machine (2) approaches a target speed (n_Gang_neu) with a low gradient.

3. The method of carrying out a load shift according to claim 2, further comprising the step of having torques of shift elements (K_alt, K_neu) and a torque of the internal combustion engine (1), acting on the electric machine (2), serve as a pre-control for the speed regulation of the electric machine (2).

4. The method of carrying out a load shift according to claim 3, further comprising the step of returning the electric machine (2) to a torque-controlled mode and completely engaging a shift element (K_neu) when the speed (n_EM) of the electric machine (2) reaches either the target speed or a synchronous speed (n_Gang_neu) of the gear to be engaged.

5. The method of carrying out a load shift according to claim 1, further comprising the steps of
   increasing, in a traction upshift, the transmission capacity of a new clutch (K_neu) to be engaged to take up the load and, at the same time, reducing the transmission capacity of an old clutch (K_alt) to be disengaged; and
   changing the electric machine (2) to a speed regulation mode, when the load has been taken up by the new clutch (K_neu) being engaged;
   adapting the speed of the electric machine (2) so as to reach the synchronous speed of the gear to be engaged, such that under speed regulation, the electric machine (2) is adjusted to either a target speed or a synchronous speed of the new gear and, at the same time, the old clutch (K_alt) being disengaged is disengaged completely.

6. The method of carrying out a load shift according to claim 1, further comprising the steps of
   reducing, in a traction downshift, the transmission capacity of the shift element (K_alt) to be disengaged;
   changing the electric machine (2) from a torque-controlled mode to a speed regulation mode as soon as slip is detected in the shift element (K_alt) being disengaged, in which the speed of the electric machine (2) is increased to a speed higher than a synchronous speed of the shift element (K_neu) to be engaged; and
   increasing the transmission capacity of the shift element (K_neu) to be engaged and reducing further the transmission capacity of the shift element (K_alt) being disengaged, such that a continuous load uptake by the shift element (K_neu) being engaged takes place; and on completion of load uptake by the shift element (K_neu) being engaged, completely disengaging the shift element (K_alt) being disengaged and adjusting the speed of the electric machine (2) to the synchronous speed of the shift element (K_neu) being engaged.

7. The method of carrying out a load shift according to claim 1, further comprising the step of:
   increasing, in a thrust downshift, the transmission capacity of the shift element (K_neu) to be engaged and, at the same time, reducing the transmission capacity of the clutch (K_alt) to be disengaged;
   changing the electric machine (2) from the torque-controlled mode to a speed regulation mode after load uptake by the shift element (K_neu) being engaged and substantially disengaging the shift element (K_alt) being disengaged; and
   adjusting the electric machine (2) under the speed regulation mode to a synchronous speed and, at the same time, completely disengaging the shift element (K_alt) being disengaged.

8. The method of carrying out a load shift according to claim 1, further comprising the steps of:
   continuously reducing, in a thrust upshift, the transmission capacity of the shift element (K_alt) to be disengaged;
   changing the electric machine (2) from a torque-controlled mode to a speed regulation mode as soon as slip is detected at the shift element (K_alt) being disengaged, in which the of the electric machine (2) speed is reduced to a value lower than a synchronous speed at the shift element (K_neu) to be engaged;
   increasing the transmission capacity of the shift element (K_neu) to be engaged and reducing the transmission capacity of the shift element (K_alt) being disengaged so that a continuous load uptake by the shift element (K_neu) to be engaged takes place; and
   completely disengaging the shift element (K_alt) being disengaged, on completion of the load uptake by the shift element (K_neu) being engaged, and adjusting the speed of the electric machine (2) in the speed regulation mode to the synchronous speed of the shift element (K_neu) being engaged.

9. A method of carrying out at least one of a thrust upshift and a traction downshift under load during hybrid operation in a parallel hybrid vehicle, the method comprising the steps of:
   initiating at least one of the thrust upshift and the traction downshift
   adjusting a transmission capacity of a new clutch (K_neu) to be engaged to take up the load, the new clutch corresponding to a new gear to be engaged and, at the same time, adjusting a transmission capacity of an old clutch (K_alt) to be disengaged, the old clutch corresponding to an old gear to be disengaged;
   carrying out speed adaptation of an electric machine (2) and an internal combustion engine (1), required for synchronization to the new gear, by adapting a speed of the electric machine (2) in a speed regulation mode; and
   only acting upon the internal combustion engine (1) if the electric machine (2) cannot supply sufficient torque to comply with the desired speed adaptation or nominal speed variation.

* * * * *